United States Patent
Yin et al.

(10) Patent No.: US 12,201,057 B2
(45) Date of Patent: Jan. 21, 2025

(54) GRASS TRIMMER

(71) Applicant: Nanjing Chervon Industry Co., Ltd., Nanjing (CN)

(72) Inventors: Yiqiang Yin, Nanjing (CN); Jianpeng Guo, Nanjing (CN); Bowei Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 314 days.

(21) Appl. No.: 17/682,690

(22) Filed: Feb. 28, 2022

(65) Prior Publication Data

US 2022/0287231 A1 Sep. 15, 2022

(30) Foreign Application Priority Data

Mar. 15, 2021 (CN) .......................... 202110275556.1
Oct. 9, 2021 (CN) .......................... 202111177023.6

(51) Int. Cl.
*A01D 34/416* (2006.01)

(52) U.S. Cl.
CPC ............................... *A01D 34/4166* (2013.01)

(58) Field of Classification Search
None
See application file for complete search history.

(56) References Cited

U.S. PATENT DOCUMENTS

| | | | |
|---|---|---|---|
| 10,306,830 B2 | 6/2019 | Nolin et al. | |
| 10,537,057 B2 | 1/2020 | Sergyeyenko et al. | |
| 11,452,258 B2 * | 9/2022 | Zhang | A01D 34/4166 |
| 2004/0134078 A1 * | 7/2004 | Pfaltzgraff | A01D 34/4163 30/276 |
| 2018/0098492 A1 * | 4/2018 | Guo | A01D 34/4163 |
| 2018/0098493 A1 * | 4/2018 | Sergyeyenko | G16H 40/63 |
| 2020/0236848 A1 * | 7/2020 | Guo | A01D 34/90 |
| 2021/0076564 A1 * | 3/2021 | Guo | A01D 34/416 |
| 2021/0137004 A1 * | 5/2021 | Nie | A01D 34/4162 |
| 2022/0287231 A1 * | 9/2022 | Yin | A01D 34/4166 |

FOREIGN PATENT DOCUMENTS

WO WO-2019076083 A1 * 4/2019 ............ A01D 34/00

OTHER PUBLICATIONS

EPO, extended European Search Report issued on European patent publication No. 4059338A1, dated Aug. 2, 2022, 6 pages.

* cited by examiner

*Primary Examiner* — Hwei-Siu C Payer
(74) *Attorney, Agent, or Firm* — Greenberg Traurig, LLP

(57) ABSTRACT

A grass trimmer includes a grass trimmer head, a drive device, and an operating member. The grass trimmer head includes a spool used for a grass trimmer rope to be wound around and a head housing for accommodating at least part of the spool. The drive device is configured to drive the grass trimmer head to rotate. The operating member is connected to the drive device and includes an operating portion for a user to operate. The grass trimmer has a winding mode. In the case where the grass trimmer is in the winding mode, movement of the operating member is transmitted to the spool or the head housing through the drive device so as to generate relative movement that is between the spool and the head housing and through which the grass trimmer rope is wound around the spool.

19 Claims, 16 Drawing Sheets

GRASS TRIMMER

RELATED APPLICATION INFORMATION

This application claims the benefit under 35 U.S.C. § 119(a) of Chinese Patent Application No. CN 202110275556.1, filed on Mar. 15, 2021, and Chinese Patent Application No. CN 202111177023.6, filed on Oct. 9, 2021, which applications are incorporated herein by reference in their entirety.

BACKGROUND

As a garden tool, a grass trimmer may generally be used for trimming lawns or trimming weeds around corners and shrubs.

The grass trimmer includes a grass trimmer head, and a grass trimmer rope is disposed on the grass trimmer head. When rotating at a high speed, the grass trimmer head can drive the grass trimmer rope to rotate together, and the grass trimmer rope rotating at a high speed trims grass. When the grass trimmer rope is too worn out to trim grass, a user needs to install a new grass trimmer rope on the grass trimmer head. The grass trimmer head generally includes a head housing and a spool disposed in the head housing, and the grass trimmer rope may be wound around the spool.

In the related art, the user generally needs to open the head housing, take out the spool, wind the grass trimmer rope around the spool, and then re-install the spool into the head housing. In this manner, the user winds the grass trimmer rope, which is time-consuming and labor-intensive, and the operation efficiency is low. Moreover, the user's hands need to touch the grass trimmer head, which is easy to soil the user's hands.

SUMMARY

A grass trimmer includes a grass trimmer head, a drive device, and an operating member. The grass trimmer head includes a spool used for a grass trimmer rope to be wound around, and a head housing for accommodating at least part of the spool. The drive device is configured to drive the grass trimmer head to rotate. The operating member is connected to the drive device and includes an operating portion for a user to operate. The grass trimmer has a winding mode. In the case where the grass trimmer is in the winding mode, movement of the operating member is transmitted to the spool or the head housing through the drive device so as to generate relative movement that is between the spool and the head housing and through which the grass trimmer rope is wound around the spool.

In some examples, the drive device includes an electric motor configured to drive the grass trimmer head to rotate, and the movement of the operating member is transmitted to the spool or the head housing through the electric motor.

In some examples, the drive device further includes a housing for accommodating the electric motor, the grass trimmer further includes a connecting rod connecting the housing, and the operating member is connected to the housing.

In some examples, the electric motor includes a motor shaft, and the grass trimmer further includes a clutch device capable of connecting the operating member to the motor shaft.

In some examples, the grass trimmer further includes a grass trimming mode, where in the case where the grass trimmer is in the grass trimming mode, the clutch device disconnects power transmission between the operating member and the motor shaft.

In some examples, the grass trimmer further includes a clutch device, where the clutch device has a first state and a second state; in the case where the clutch device is in the first state, the movement of the operating member is transmitted to the drive device through the clutch device, and the grass trimmer enters the winding mode; and in the case where the clutch device is in the second state, the clutch device disconnects power transmission between the operating member and the drive device, and the grass trimmer enters a grass trimming mode.

In some examples, the drive device includes an electric motor configured to drive the spool or the head housing, and the electric motor includes a motor shaft; in the case where the grass trimmer is in the winding mode, the electric motor is not powered on, and the operating member mechanically drives the motor shaft to rotate; the grass trimmer further includes a grass trimming mode, where in the case where the grass trimmer is in the grass trimming mode, the electric motor is powered on, starts to operate, and drives the grass trimmer head to rotate.

In some examples, in the case where the grass trimmer is in the winding mode, rotation of the operating member is transmitted to the spool through the drive device, and the drive device is connected to the spool.

In some examples, in the case where the grass trimmer is in the winding mode, a distance between the operating portion and a rotation axis of the operating member is greater than or equal to 40 mm and less than or equal to 100 mm.

In some examples, the grass trimmer further includes an electric motor, where the drive device is connected to the electric motor and the grass trimmer head so as to transmit power outputted by the electric motor to the grass trimmer head, the operating member is connected to the drive device, and in the case where the grass trimmer is in the winding mode, the operating member drives the drive device, and the drive device drives the spool or the head housing so as to generate relative movement between the spool and the head housing.

DETAILED DESCRIPTION

Figure 1:
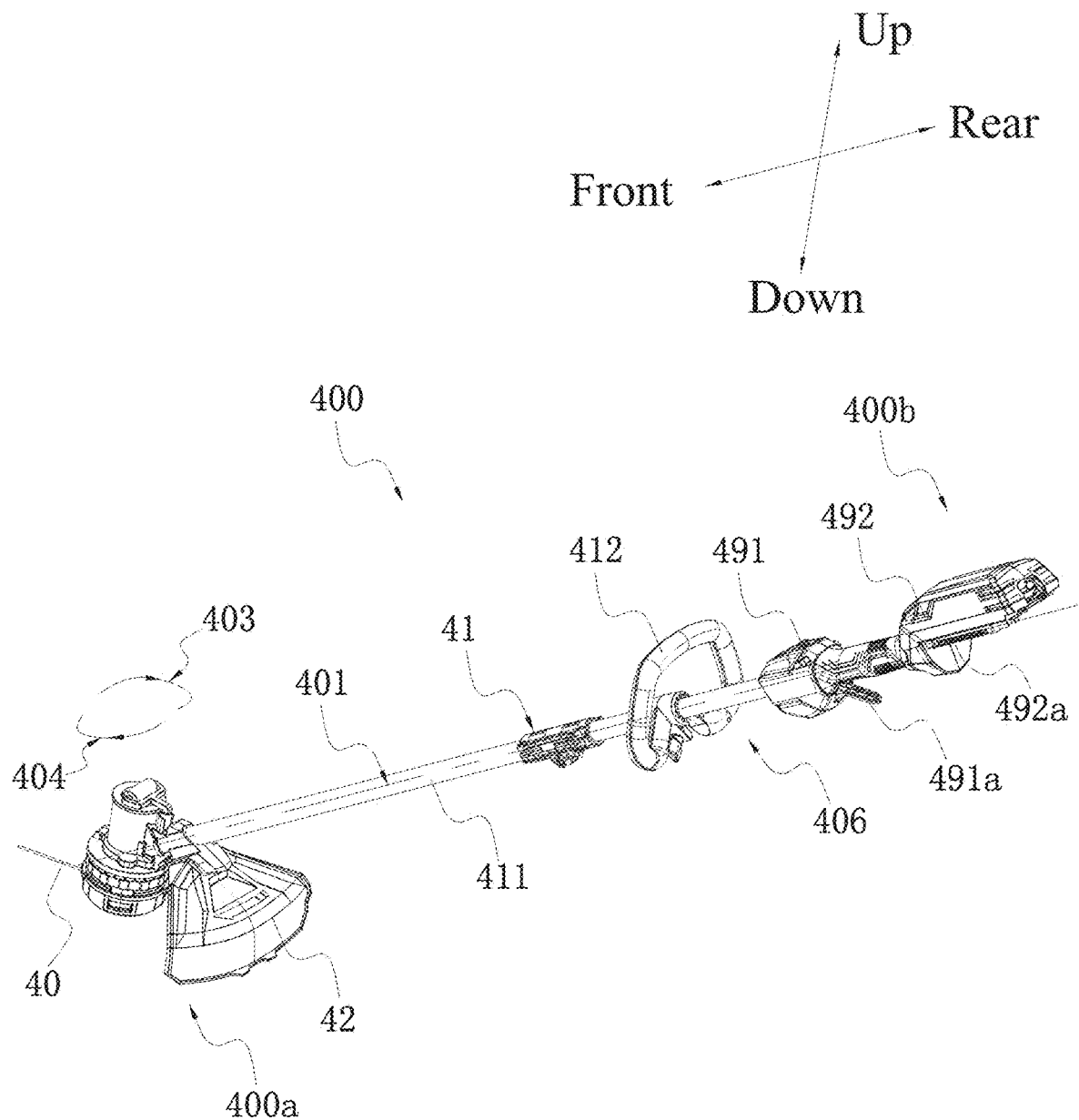
FIG. 1 is a perspective view of a grass trimmer according to a first example.

A grass trimmer 400 in a first example shown in FIG. 1 is used for trimming lawns. Specifically, a user may operate the grass trimmer 400 to cut grass on the lawn or trim grass around shrubs or buildings. The grass trimmer 400 is installed with a grass trimmer rope 40, and the grass trimmer rope 40 rotates at a high speed so that the grass is cut.

The grass trimmer 400 includes a front end device 400a, a connecting rod assembly 41, and a rear end device 400b. The front end device 400a is disposed at a front end of the connecting rod assembly 41, and the rear end device 400b is disposed at a rear end of the connecting rod assembly 41. The connecting rod assembly 41 includes a connecting rod 411 and an auxiliary handle 412. The connecting rod 411 is configured to connect the front end device 400a, the rear end device 400b, and the auxiliary handle 412, and the connecting rod 411 basically extends along a direction of a first straight line 401. In other examples, the connecting rod 411 may also extend along a curve. The auxiliary handle 412 is used for the user to hold in an auxiliary manner, and a position of the auxiliary handle 412 on the connecting rod 411 may be adjusted along the direction of the first straight line 401. A direction along the first straight line 401 toward the front end device 400a is defined as the front, and a direction along the first straight line 401 toward the rear end device 400b is defined as the rear.

The rear end device 400b includes a main handle 491, a rear housing 492, and a circuit board assembly disposed in the rear housing 492. The main handle 491 is for the user to hold. When the user operates the grass trimmer 400, the main handle 491 and the auxiliary handle 412 may be respectively held by two hands so that the grass trimmer 400 is operated more stably. The main handle 491 is further provided with an operation switch 491a for activating and powering on the grass trimmer 400. After powered on, the grass trimmer 400 can drive the grass trimmer rope 40 to rotate at a high speed so as to cut the grass. The rear housing 492 is integrally formed with the main handle 491. In other examples, the rear housing 492 may also be provided separately from the main handle 491. The rear housing 492 is further formed with a joint portion 492a, the joint portion 492a is configured to be connected to an energy device, the energy device is a battery pack, and the battery pack is configured to supply a power source to the grass trimmer 400. In other examples, the joint portion 492a may also be connected to a cable, and the cable may be connected to a mains electricity grid. In other examples, the joint portion 492a may also be connected to other energy devices. For example, the joint portion 492a may be provided with a fuel tank, and the fuel in the fuel tank may supply power to the grass trimmer 400.

Figure 2:
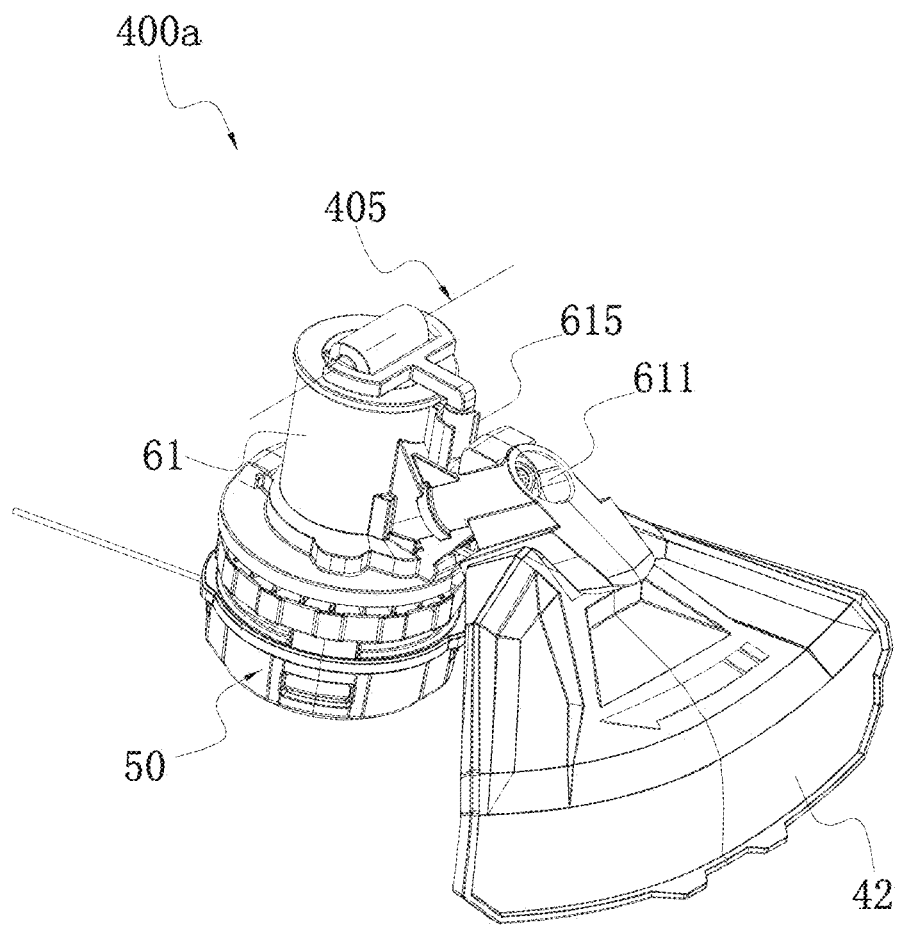
FIG. 2 is a perspective view of a front end device of the grass trimmer in FIG. 1.
Figure 3:
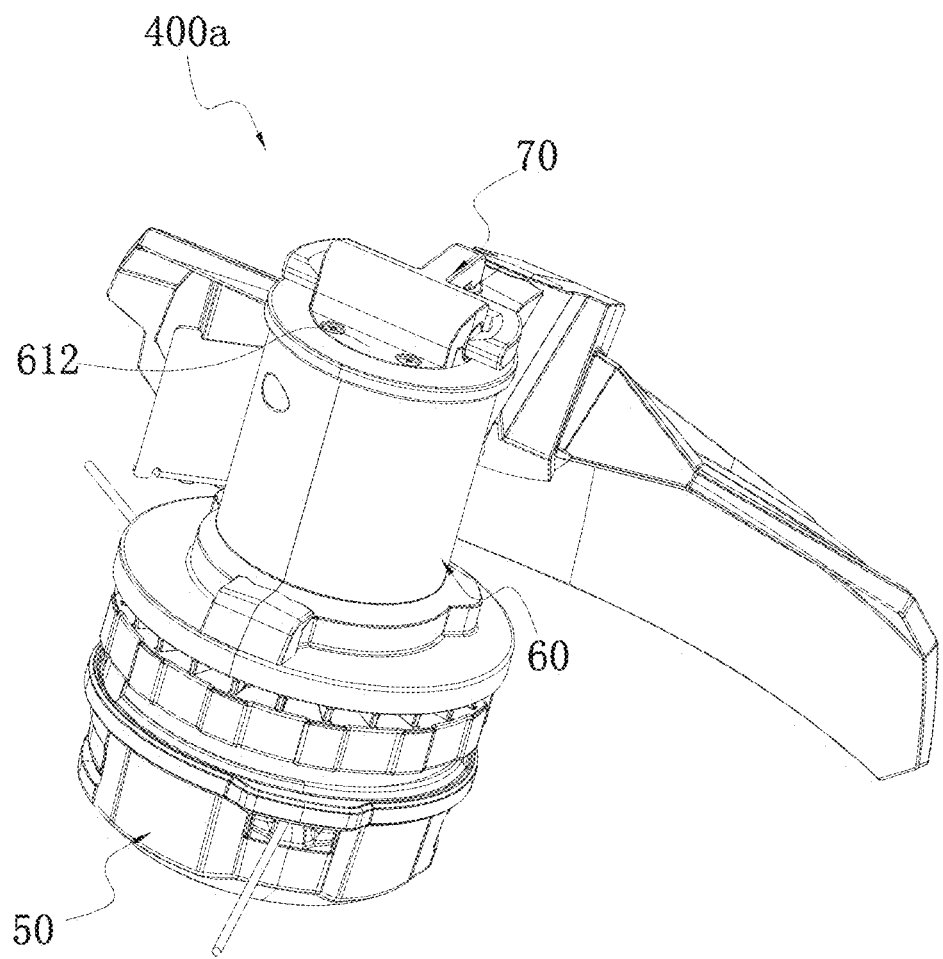
FIG. 3 is a perspective view of the front end device in FIG. 2 from another angle.
Figure 4:
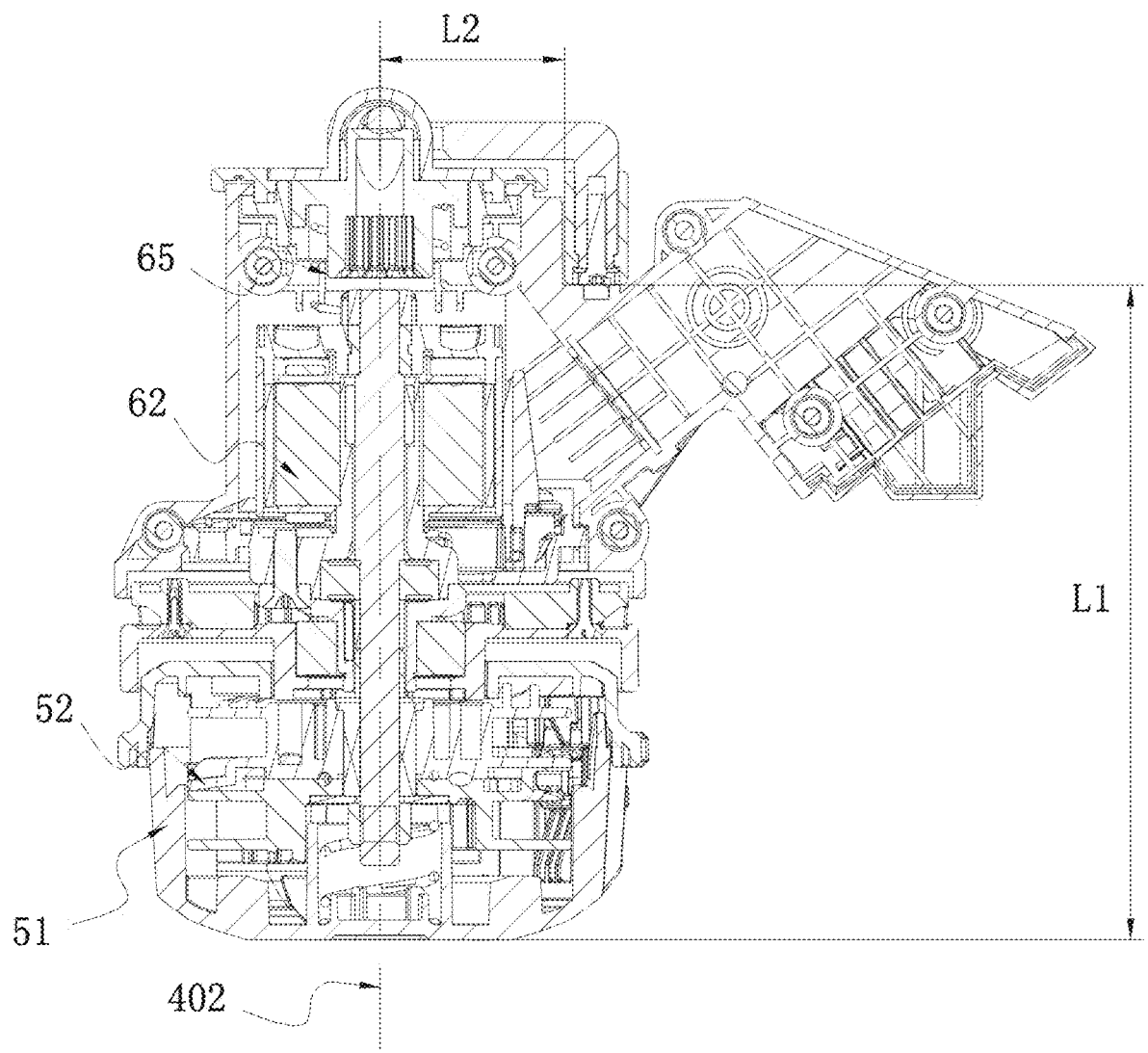
FIG. 4 is a sectional view of the front end device in FIG. 2 with a shield removed.

As shown in FIGS. 1 and 2, the front end device 400a includes a grass trimmer head 50 and a drive device 60, and the grass trimmer head 50 is used for installing the grass trimmer rope 40 so as to drive the grass trimmer rope 40 to rotate at a high speed. The drive device 60 is configured to drive the grass trimmer head 50 to rotate.

The front end device 400a further includes a shield 42 surrounding at least part of the drive device 60 or the grass trimmer head 50. The shield 42 is configured to prevent grass clippings from being splashed on the user. The grass trimmer head 50 is used for installing the grass trimmer rope 40. As shown in FIGS. 2 to 6, the grass trimmer head 50 includes a head housing 51 and a spool 52, the spool 52 is used for the grass trimmer rope 40 to be wound around, and the head housing 51 is used for accommodating at least part of the spool 52. A winding portion 521 is formed on the spool 52, two threading elements 53 are connected to the head housing 51, and two ends of the grass trimmer rope 40 pass through threading holes 531 on the threading elements 53, respectively. A part of the grass trimmer rope 40 located in the head housing 51 is wound around the winding portion 521. When the grass trimmer head 50 rotates at a high speed, the spool 52 and the head housing 51 drive the grass trimmer rope 40 to rotate at a high speed, and the rotating grass trimmer rope 40 can cut the grass.

In this example, the head housing 51 includes an upper housing 511 and a lower housing 512, and the spool 52 is disposed between the upper housing 511 and the lower housing 512. The upper housing 511 is further provided with a fan 514. When the grass trimmer head 50 rotates, the head housing 51 drives the fan 514 to rotate, and the rotating fan 514 can generate a flowing airflow. The airflow can not only dissipate heat from the drive device 60, but also flow in a direction away from the grass trimmer head 50 so as to prevent the front end device 400a from being entangled with grass clippings.

The drive device 60 is disposed on an upper side of the grass trimmer head 50 and configured to drive the grass trimmer head 50 to rotate. In this example, the drive device 60 is connected to the spool 52, the drive device 60 drives the spool 52 to rotate about a first axis 402, and a transmission mechanism is disposed between the spool 52 and the head housing 51. In this example, the transmission mechanism includes a first driving portion 522 disposed on the spool 52 and a first mating portion 513 disposed on the head housing 51. When the drive device 60 drives the spool 52 to rotate about the first axis 402, the first driving portion 522 mates with the first mating portion 513 to drive the head housing 51 to rotate together with the spool 52 around the first axis 402 so that the grass trimmer 400 is in a grass trimming mode. In other examples, the drive device 60 may also be connected to the head housing 51, the drive device 60 drives the head housing 51 to rotate, and through the first mating portion 513, the head housing 51 drives the spool 52 to rotate together. In this example, when the grass trimmer 400 is in the grass trimming mode, the drive device 60 drives the grass trimmer head 50 to rotate about the first axis 402 in a first rotation direction 403. As shown in FIG. 1, the first rotation direction 403 may be a clockwise direction when viewed from top to bottom. It is to be understood that in other examples, the first rotation direction may also be a counterclockwise direction when viewed from top to bottom.

The front end device 400a further includes an operating device 70, the operating device 70 is connected to the drive device 60, and the operating device 70 includes an operating member 71 for the user to operate.

The grass trimmer 400 further has a winding mode. When the grass trimmer 400 is in the winding mode, the user operates the operating member 71 to make the operating member 71 move. At this time, movement of the operating member 71 is transmitted to the spool 52 or the head housing 51 through the drive device 60 so as to generate relative movement that is between the spool 52 and the head housing 51 and through which the grass trimmer rope 40 is wound around the spool 52. Specifically, when the grass trimmer rope 40 is used up, the user needs to install a new grass trimmer rope 40 on the grass trimmer head 50. At this time, the user may pass the grass trimmer rope 40 through the threading holes 531 to make a part of the grass trimmer rope 40 located in the head housing 51, and then the user operates the operating member 71. The movement of the operating member 71 is transmitted to the spool 52 through the drive device 60 so as to drive the spool 52 to rotate about the first axis 402 in a second rotation direction 404, the spool 52 rotates relative to the head housing 51, and the rotating spool 52 winds the grass trimmer rope 40 around the winding portion 521. The second rotation direction 404 is opposite to the first rotation direction 403. For example, the first rotation direction 403 is a clockwise direction, and the second rotation direction 404 is a counterclockwise direction. In this example, the operating member 71 moves to drive the spool 52 to rotate relative to the head housing 51 so that the user can wind the grass trimmer rope 40 around the spool 52 with less effort. On one hand, when winding the grass trimmer rope 40, the user does not need to disassemble the spool 52 from the head housing 51 so that a winding effect is higher. On the other hand, the operation switch 491a installed on the main handle 491 does not need to be activated, that is, when the grass trimmer 400 is in the winding mode, the grass trimmer 400 does not need to consume the power of the energy device, and the battery pack does not need to output power at this time, thereby saving energy. Furthermore, the grass trimmer 400 is configured not to be activated, and only through mechanical movement of the operating device 70, the movement may be mechanically transmitted to the spool 52 through the drive device 60, so as to ensure the reliability of the winding, and no winding failure occurs. In addition, the movement of the operating member 71 is transmitted to the spool 52 through the drive device 60 without additionally disposing a transmission device for power transmission, which can further reduce a dimension of the grass trimmer 400 and reduce the manufacturing cost of the grass trimmer 400.

Figure 5:
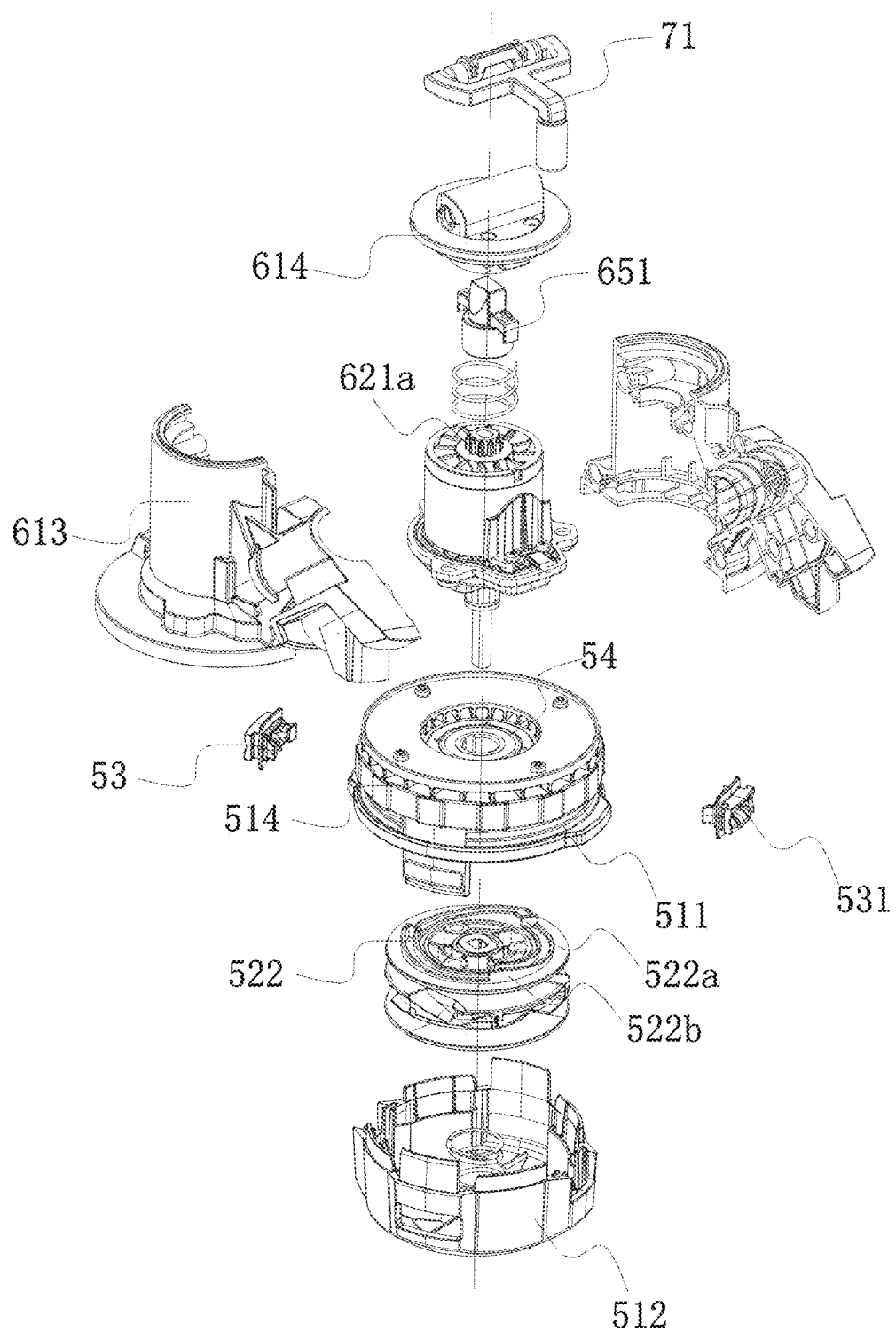
FIG. 5 is an exploded view of the front end device in FIG. 2 with a shield removed.
Figure 6:
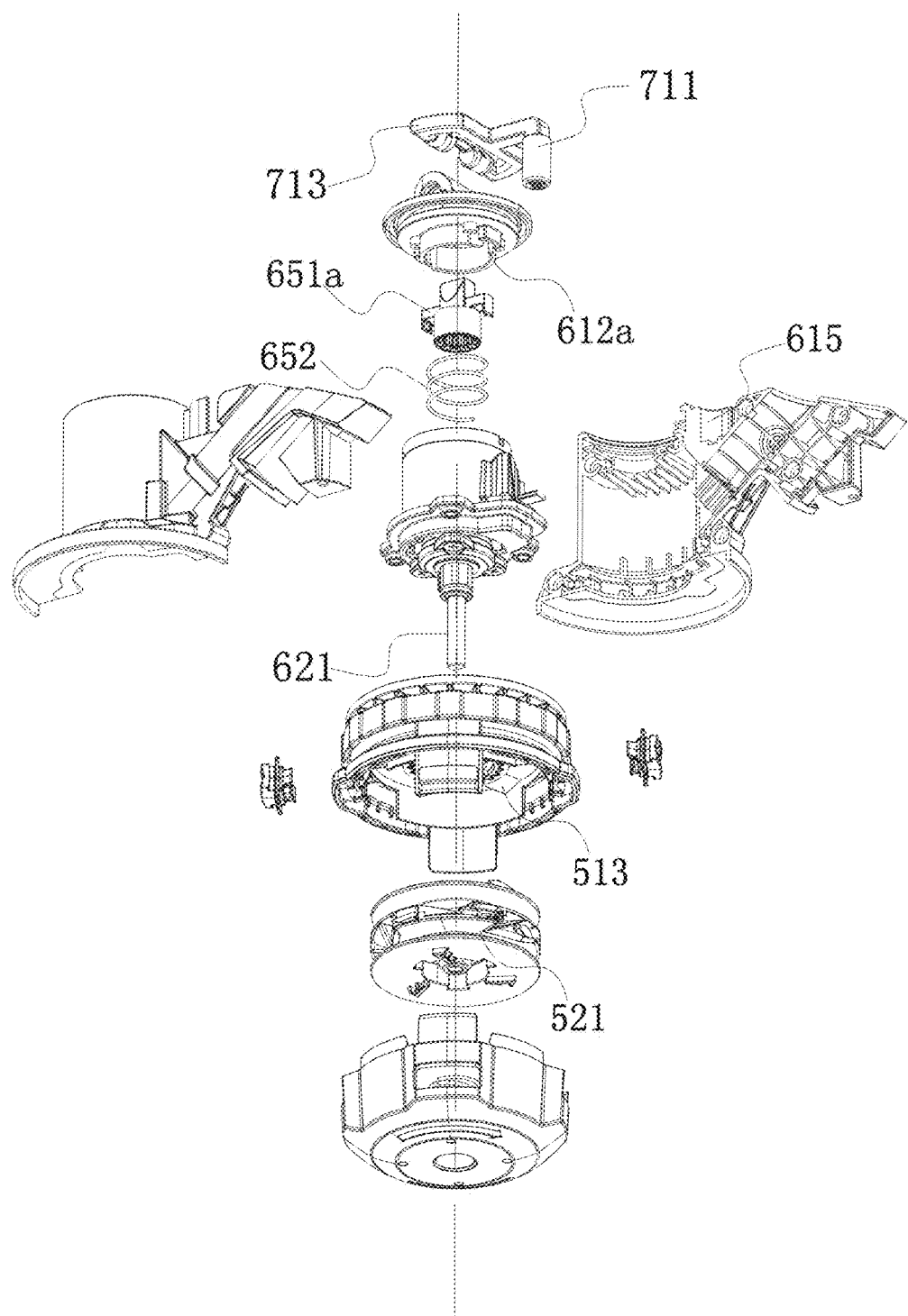
FIG. 6 is an exploded view of the front end device in FIG. 2 with a shield removed from another angle.

As shown in FIG. 5, the first driving portion 522 includes a driving surface 522a and an inclined surface 522b. When the spool 52 rotates along the first rotation direction 403, the driving surface 522a is in contact with the first mating portion 513 so as to drive the head housing 51 to rotate with the spool 52, and the grass trimmer 400 is in the grass trimming mode. When the spool 52 rotates along the second rotation direction 404, the inclined surface 522b of the spool 52 is in contact with the first mating portion 513, the inclined surface 522b cannot drive the head housing 51 to rotate with the spool 52, and the inclined surface 522b passes over the first mating portion 513 so that the spool 52 can rotate relative to the head housing 51 along the second rotation direction 404, and the grass trimmer 400 is in the winding mode at this time.

The grass trimmer 400 further includes a limiter 54 configured to restrict rotation of the head housing 51 along the second rotation direction 404, the limiter 54 is a one-way bearing connected to the upper housing 511, and the one-way bearing allows the head housing 51 to rotate along the first rotation direction 403, but the one-way bearing does not allow the head housing 51 to rotate along the second rotation direction 404. In this manner, when the spool 52 rotates along the first rotation direction 403, the one-way bearing does not restrict the rotation of the head housing 51, and the head housing 51 can rotate together with the spool 52. When the spool 52 rotates along the second rotation direction 404, the one-way bearing restricts the rotation of the head housing 51 along the second rotation direction 404, and the spool 52 cannot drive the head housing 51 to rotate together. At this time, the spool 52 moves relative to the head housing 51, and thus the grass trimmer rope 40 is wound around the spool 52. In other examples, the limiter 54 may also be another limiting device with two states. In one state, the limiter 54 allows the head housing 51 to rotate, and in the other state, the limiter 54 restricts the rotation of the head housing 51.

In this example, the drive device 60 includes a housing 61 and a motor disposed in the housing 61, and the motor is specifically an electric motor 62. The battery pack can supply power to the electric motor 62, and the circuit board assembly is electrically connected to the electric motor 62 so as to control the electric motor 62. The operation switch 491a is configured to activate the electric motor 62. When the grass needs to be cut, the user presses the operation switch 491a, the operation switch 491a powers on the electric motor 62, and the electric motor 62 drives the spool 52 to rotate about the first axis 402 along the first rotation direction 403. At this time, the grass trimmer head 50 rotates about the first axis 402 at a high speed, and the grass trimmer 400 is in the grass trimming mode. When the grass trimmer rope 40 needs to be wound, the user operates the operating member 71, and the movement of the operating member 71 is mechanically transmitted to the spool 52 through the electric motor 62 so as to drive the spool 52 to rotate about the first axis 402 along the second rotation direction 404 so that the spool 52 moves relative to the head housing 51, and the grass trimmer 400 is in the winding mode. When the grass trimmer 400 is in the winding mode, the operation switch 491a is not operated, the electric motor 62 is not powered on, and only the electric motor 62 mechanically transmits the movement of the operating member 71 to the spool 52, thereby reducing the failure possibility of the winding mode and reducing the power consumed by the electric motor 62.

The electric motor 62 includes a motor shaft 621, the motor shaft 621 extends along the first axis 402, the motor shaft 621 can rotate about the first axis 402, and the motor shaft 621 is connected to the spool 52. In other examples, the motor shaft 621 may also be connected to the head housing 51. In other examples, the motor shaft 621 may also be configured to rotate about an axis parallel to the first axis 402. In other examples, the motor shaft 621 may also be configured to rotate about an axis inclined relative to the first axis 402.

The housing 61 accommodates at least part of the electric motor 62, the grass trimmer head 50 is disposed outside the housing 61, and the motor shaft 621 extends from an inside of the housing 61 to an outside of the housing 61 and into the grass trimmer head 50. The housing 61 is further formed with a connecting hole 611 into which the connecting rod 411 is inserted to be connected to the housing 61 so that the front end device 400a is connected to a front end of the connecting rod 411. The other end of the connecting rod 411 is inserted into the main handle 491 and connected to the rear end device 400b.

The operating device 70 is connected to the housing 61, and the operating member 71 is connected to an outer wall of the housing 61 so that the operating member 71 is located on the upper side of the grass trimmer head 50, which is convenient for the user to operate. The operating member 71 specifically includes an operating portion 711 for the user to operate, and the operating portion 711 is disposed on the upper side of the grass trimmer head 50. In this manner, when the user operates the operating member 71, the user's hands can be kept away from the grass trimmer head 50 and not touch the grass trimmer head 50 so that the hands are not soiled and the subsequent grass trimming operation is not affected. In addition, the operating member 71 is disposed on the upper side of the grass trimmer head 50 so that the operating member 71 can be prevented from being entangled with grass clippings and the operating member 71 can be prevented from being stained with soil.

Figure 8:
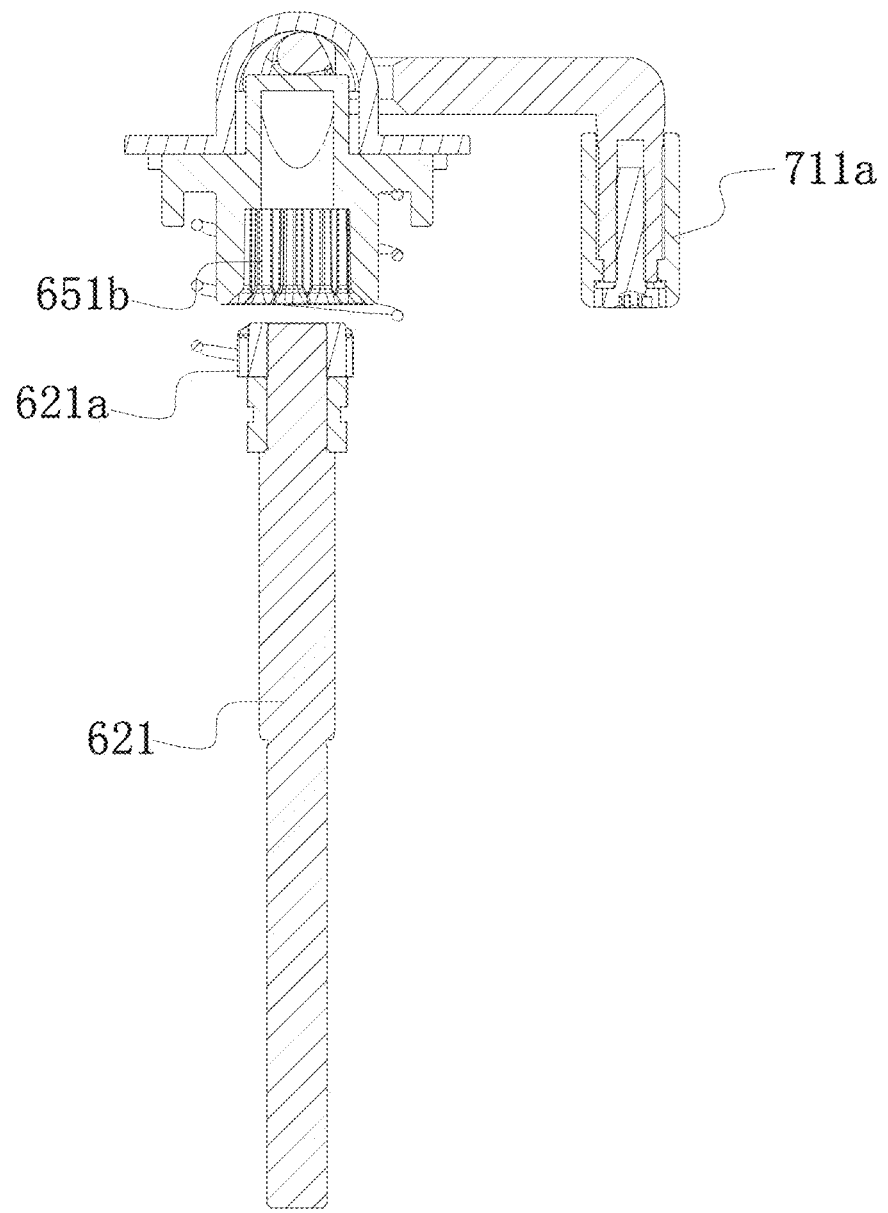
FIG. 8 is a sectional view of an operating member, a clutch device, and a motor shaft in FIG. 4 when the operating member is at a second position.
Figure 9:
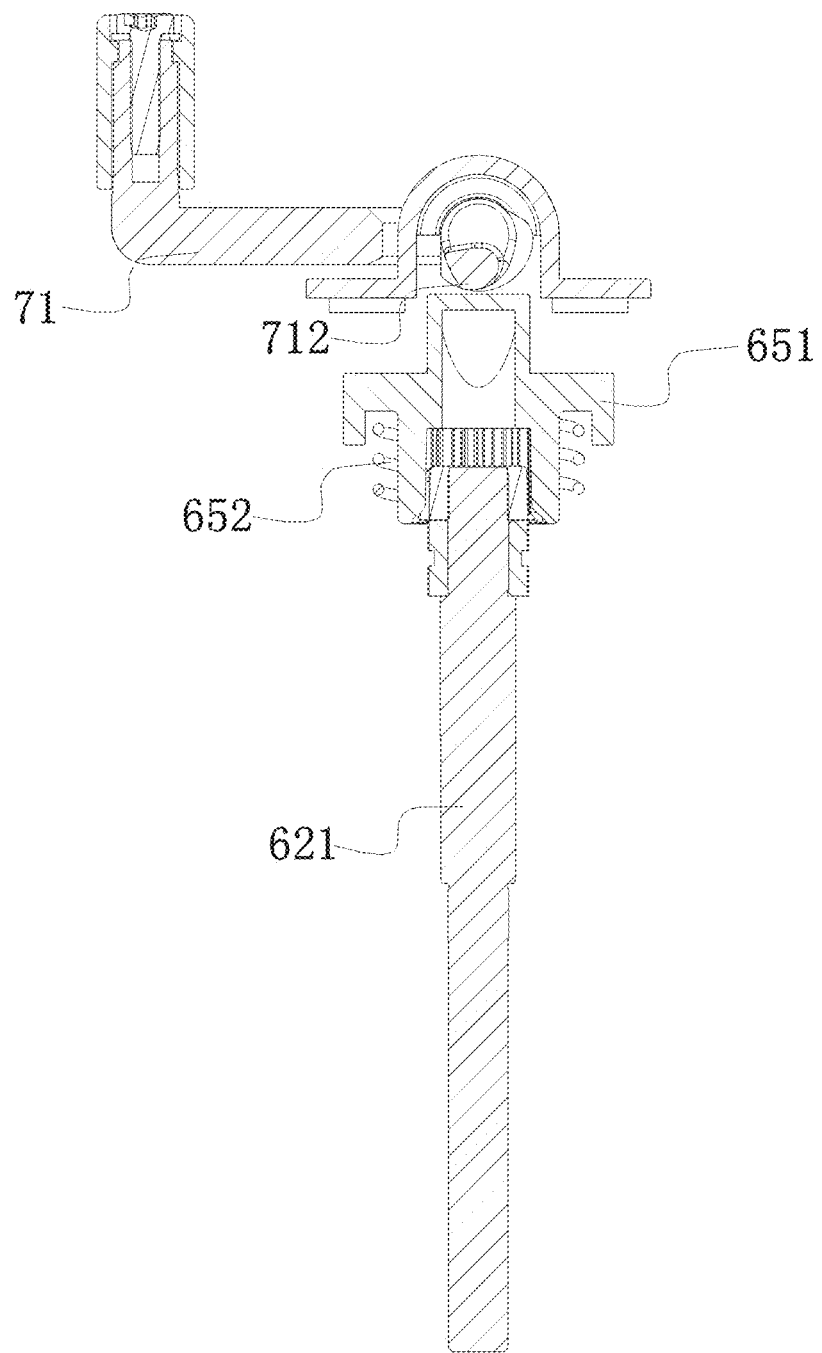
FIG. 9 is a sectional view of an operating member, a clutch device, and a motor shaft in FIG. 4 when the operating member is at a first position.

The front end device 400a further includes a clutch device 65 disposed between the operating device 70 and the drive device 60. In this example, the clutch device 65 may connect the operating member 71 to the motor shaft 621. The clutch device 65 is disposed at an end of the motor 62 away from the grass trimmer head 50. As shown in FIGS. 8 and 9, the clutch device 65 has a first state and a second state. In the case where the clutch device 65 is in the first state, the movement of the operating member 71 is transmitted to the drive device 60 through the clutch device 65, and the grass trimmer 400 enters the winding mode. In the case where the clutch device 65 is in the second state, the clutch device 65 disconnects power transmission between the operating member 71 and the drive device 60, and the grass trimmer 400 exits the winding mode and enters the grass trimming mode.

When the clutch device 65 is in the first state, the clutch device 65 connects the operating device 70 to the motor shaft 621, and the movement of the operating member 71 may be transmitted to the spool 52 through the motor shaft 621 at this time. When the clutch device 65 is in the second state, the clutch device 65 disconnects power transmission between the operating device 70 and the motor shaft 621, and the movement of the operating member 71 cannot be transmitted to the motor shaft 621 through the clutch device 65 at this time.

In fact, the operating member 71 may move to a first position and a second position relative to the housing 61. When the operating member 71 is at the first position, the operating member 71 drives the clutch device 65 to switch to the first state. When the operating member 71 moves to the second position, the operating member 71 drives the clutch device 65 to switch to the second state. That is, the first position of the operating member 71 corresponds to the first state of the clutch device 65, and the second position of the operating member 71 corresponds to the second state of the clutch device 65.

As shown in FIGS. 8 and 9, when the user needs to wind the rope, the operating member 71 may move from the second position to the first position. At this time, the operating member 71 drives the clutch device 65 to switch from the second state to the first state. The clutch device 65 connects the operating member 71 to the motor shaft 621 and can achieve power transmission between the operating member 71 and the motor shaft 621, and the operating member 71 may mechanically drive the motor shaft 621 to rotate. At this time, the user holds the operating member 71 and rotates the operating member 71 about the first axis 402, the clutch device 65 also rotates about the first axis 402 along with the operating member 71, and then the clutch device 65 drives the motor shaft 621 to rotate about the first axis 402, and the rotating motor shaft 621 drives the spool 52 to rotate relative to the head housing 51 along the second rotation direction 404, thereby winding the grass trimmer rope 40 around the spool 52.

After the grass trimmer rope 40 is wound, the user needs to use the grass trimmer 400 to trim the grass. At this time, the user releases the operating member 71 or drives the operating member 71 to be reset to the second position, the clutch device 65 is also reset to the second state, and the clutch device 65 disconnects the power transmission between the operating member 71 and the motor shaft 621. At this time, the user turns on the operation switch 491a, the electric motor 62 is powered on and starts to operate, the motor shaft 621 rotates, and the rotating motor shaft 621 drives the grass trimmer head 50 to rotate at a high speed so as to trim the grass. At this time, the grass trimmer 400 is in the grass trimming mode. When the clutch device 65 is at the second position and the motor shaft 621 rotates, the clutch device 65 does not transmit movement of the motor shaft 621 to the operating member 71, so the operating member 71 remains stationary at this time.

The clutch device 65 is provided so that the grass trimmer head 50 can be switched between the grass trimming mode and the winding mode. When the grass trimmer 400 trims the grass, the operating member 71 does not move; and when the rope in the grass trimmer 400 is wound, the electric motor 62 is not powered on. Therefore, the grass trimming mode and the winding mode of the grass trimmer 400 do not interfere with each other.

Figure 7:
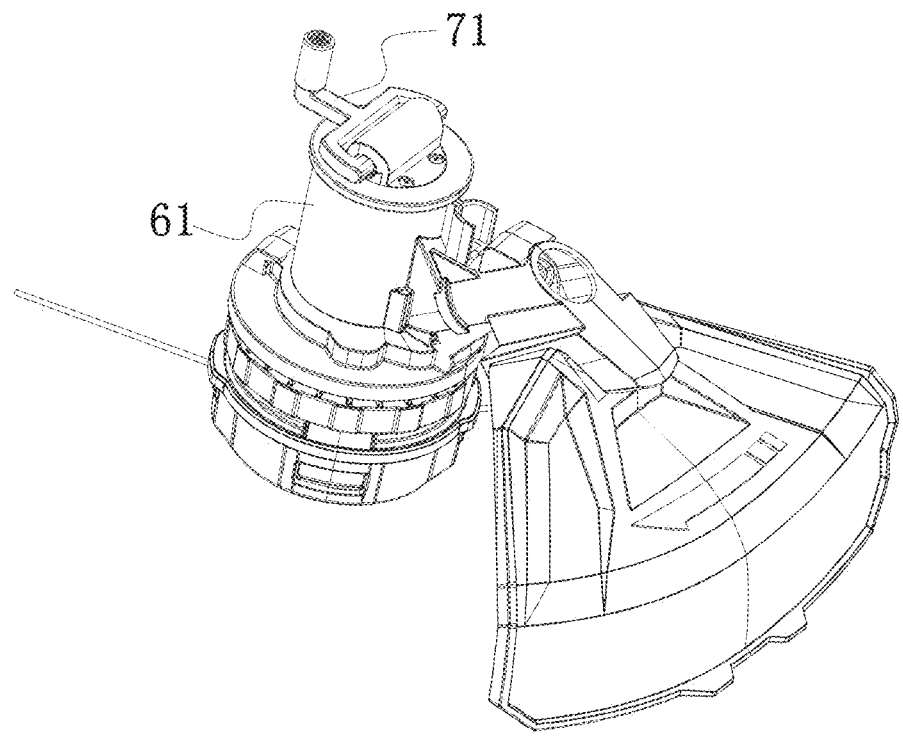
FIG. 7 is a perspective view of the front end device of the grass trimmer in FIG. 2 when an operating member is at a first position.

As shown in FIGS. 5 to 9, the operating member 71 may rotate relative to the housing 61 around a second axis 405. When rotating relative to the housing 61 around the second axis 405, the operating member 71 may rotate to the second position shown in FIG. 2, and the operating member 71 may also rotate relative to the housing 61 around the second axis 405 to the first position shown in FIG. 7. As shown in FIGS. 2 and 8, when the operating member 71 rotates to the second position, the clutch device 65 is reset to the second state, and the clutch device 65 disconnects power transmission between the operating member 71 and the electric motor 62. As shown in FIGS. 7 and 9, when the operating member 71 rotates to the first position, the operating member 71 drives the clutch device 65 to switch to the first state, and the clutch device 65 connects the operating member 71 to the electric motor 62. At this time, the clutch device 65 may achieve power transmission between the operating member 71 and the motor shaft 621.

The second axis 405 is perpendicular to the first axis 402. The housing 61 is provided with a mount 612, and the operating member 71 is installed to the mount 612 and may rotate relative to the mount 612 around the second axis 405.

The housing 61 includes a surrounding portion 613 and a top portion 614, the surrounding portion 613 surrounds the electric motor 62, the top portion 614 is disposed on an upper side of the electric motor 62, and the top portion 614 is connected to an upper side of the surrounding portion 613. The mount 612 for installing the operating member 71 is disposed on the top portion 614 so that the operating member 71 is connected to the top portion 614. The operating member 71 may rotate relative to the top portion 614 around the second axis 405 to move to the first position and the second position. The operating member 71 may also drive the mount 612 to rotate relative to the surrounding portion 613 about the first axis 402. In this example, the mount 612 is fixedly connected to the top portion 614, the mount 612 rotates in sync with the top portion 614, and a whole formed by the operating member 71, the mount 612, and the top portion 614 may rotate relative to the surrounding portion 613 about the first axis 402. In other examples, the mount may also be rotatably connected to the top portion. When the operating member 71 moves to the first position, the user operates the operating member 71 to rotate the operating member 71 about the first axis 402, and at this time, the operating member 71 drives the mount 612 and the top portion 614 to rotate relative to the surrounding portion 613 around the first axis 402. The clutch device 65 rotates in sync with the mount 612. When the operating member 71 is at the first position, the clutch device 65 is connected to the motor shaft 621, the operating member 71 drives the mount 612 to rotate about the first axis 402, and the clutch device 65 also rotates about the first axis 402 along with the mount 612 so that the clutch device 65 drives the motor shaft 621 to rotate about the first axis 402. At this time, the clutch device 65 transmits rotation of the operating member 71 to the motor shaft 621 so that the spool 52 may rotate relative to the head housing 51, thereby achieving winding.

The clutch device 65 specifically includes a clutch element 651 and a reset element 652. The clutch element 651 may move to a transmission position and a non-transmission position. The reset element 652 is a spring that biases the clutch element 651 to move toward the non-transmission position. When the operating member 71 is operated by the user to move from the second position to the first position, the operating member 71 drives the clutch element 651 to move from the non-transmission position to the transmission position, and the clutch device 65 switches from the second state to the first state. That is, when the clutch element 651 is at the transmission position, the clutch device 65 is in the first state; and when the clutch element 651 is in the non-transmission position, the clutch device 65 is in the second state. Specifically, the operating member 71 is formed with a driving portion 712 which is a cam portion. When the operating member 71 moves from the second position to the first position, the driving portion 712 drives the clutch element 651 to move along the first axis 402 toward the motor shaft 621 so that the clutch element 651 is finally connected to the motor shaft 621, and the clutch device 65 switches to the first state at this time. When the clutch element 651 moves to the non-transmission position, the clutch element 651 is disengaged from the motor shaft 621, and the clutch device 65 switches to the second state. A position of the mount 612 remains fixed along the first axis 402. When the operating member 71 moves relative to the mount 612 around the second axis 405 from the second position to the first position, the driving portion 712 is to be in contact with the clutch element 651 and then drives the clutch element 651 to slide relative to the mount 612. The mount 612 rotates in sync with the clutch element 651, the mount 612 is formed with a mounting groove 612a, and the clutch element 651 includes an arm 651a which can be inserted into the mounting groove 612a. The mounting groove 612a mates with the arm 651a, the mounting groove 612a rotates in sync with the arm 651a about the first axis 402, and the mounting groove 612a also allows the arm 651a to slide along a direction of the first axis 402.

The reset element 652 generates a biasing press that drives the clutch element 651 to move toward the non-transmission position. When the operating member 71 is reset from the first position to the second position, the operating member 71 allows the clutch element 651 to be reset to the non-transmission position. At this time, the reset element 652 drives the clutch element 651 to be reset to the non-transmission position so that it can be ensured that when the user does not operate the operating member 71, the clutch element 651 remains at the non-transmission position and does not affect the grass trimming of the grass trimmer 400. Specifically, the reset element 652 is a spring, the spring abuts against the clutch element 651, and the biasing press generated by the spring biases the clutch element 651 to move in a direction away from the motor shaft 621.

The clutch element 651 is formed with a first transmission portion 651b, the motor shaft 621 is formed with or connected to a second transmission portion 621a, and the first transmission portion 651b and the second transmission portion 621a can mate with each other. Specifically, the clutch element 651 is formed with a transmission hole, a hole wall of the transmission hole is formed with the first transmission portion 651b, and the first transmission portion 651b is first meshing teeth. The motor shaft 621 is fixedly connected to a driving wheel, the driving wheel is formed with the second transmission portion 621a, and the second transmission portion 621a is second meshing teeth. When the clutch element 651 moves to the transmission position, the driving wheel extends into the transmission hole, the first transmission portion 651b is meshed with the second transmission portion 621a, and the clutch element 651 can drive the motor shaft 621 to rotate. When the clutch element 651 moves to the non-transmission position, the first transmission portion 651b is disengaged from the second transmission portion 621a.

In this example, the operating member 71 is at least partially disposed on an upper side of the drive device 60 so that the user operates more conveniently, and when the user winds the rope, the user's hands can be kept away from the grass trimmer head 50 and the arm 651a can be prevented from being soiled.

Specifically, the operating member 71 further includes a connecting portion 713 used for connecting the operating member 71 to the mount 612. The operating member 71 is disposed at least partially on the upper side of the grass trimmer head 50. Along the direction of the first axis 402, a distance L1 between the operating member 71 and a lower end surface of the grass trimmer head 50 is greater than or equal to 30 mm and less than or equal to 220 mm. In this manner, when the user operates the operating portion 711, a certain distance exists between the user's hands and the lower end surface of the grass trimmer head 50 so that the user's hands do not touch the ground or the lower end surface of the grass trimmer head 50. When the grass trimmer 400 switches from the grass trimming mode to the winding mode, the position of the operating portion 711 changes.

A part other than the operating member 71 of the grass trimmer 400 is defined as a main body 406. The main body 406 includes the rear end device 400b, the connecting rod assembly 41, the auxiliary handle 412, the drive device 60, and the grass trimmer head 50. In this example, the operating member 71 is fixedly installed to the main body 406. Specifically, the operating member 71 is installed to the housing 61. In this manner, even when the grass trimmer 400 is in the grass trimming mode, the operating member 71 is still installed to the main body 406. Therefore, regardless of whether the grass trimmer 400 is in the winding mode or the grass trimming mode, the operating member 71 is installed on the housing 61, and the operating member 71 will never be disengaged from the main body 406 so that the operating member 71 can be prevented from being lost.

In this example, the operating member 71 is fixedly installed to the mount 612. In other examples, the operating member may also be detachably installed to the mount. Alternatively, in other examples, the operating member may also be non-detachably installed to the mount.

In other examples, when the operating member 71 is detachably installed to the mount 612, other parts of the main body 406 may further be provided with a receiving groove capable of receiving the operating member 71. When the grass trimmer 400 is in the winding mode, the operating member 71 is installed to the mount 612. When the grass trimmer 400 is in the grass trimming mode, the operating member 71 is installed to the receiving groove. In this manner, even when the grass trimmer 400 is in the grass trimming mode, the operating member 71 may still be installed to the main body 406 so that the operating member 71 can be prevented from being lost.

As shown in FIG. 2, the housing 61 is further formed with an accommodation groove 615, and when the operating member 71 is at the second position, the operating portion 711 is inserted into the accommodation groove 615. When the user does not operate the operating member 71, the accommodation groove 615 can restrict the operating member 71 from being disengaged from the accommodation groove 615 so that the operating member 71 can be prevented from being shaken.

As shown in FIGS. 7 and 8, the operating portion 711 further includes a roller 711a, and the roller 711a is rotatably connected to the connecting portion 713 so that the user may operate the operating member 71 by operating the roller 711a, thereby making the user's operation more labor-saving.

In this example, when the grass trimmer 400 is in the winding mode, the user rotates the operating member 71 about the first axis 402, and a distance L2 between the operating portion 711 and the first axis 402 is greater than or equal to 40 mm and less than or equal to 100 mm. In this manner, the user can save efforts when rotating the operating member 71, and at the same time, the operating member 71 can be prevented from being too large to affect a dimension of the front end device 400a.

Figure 10:
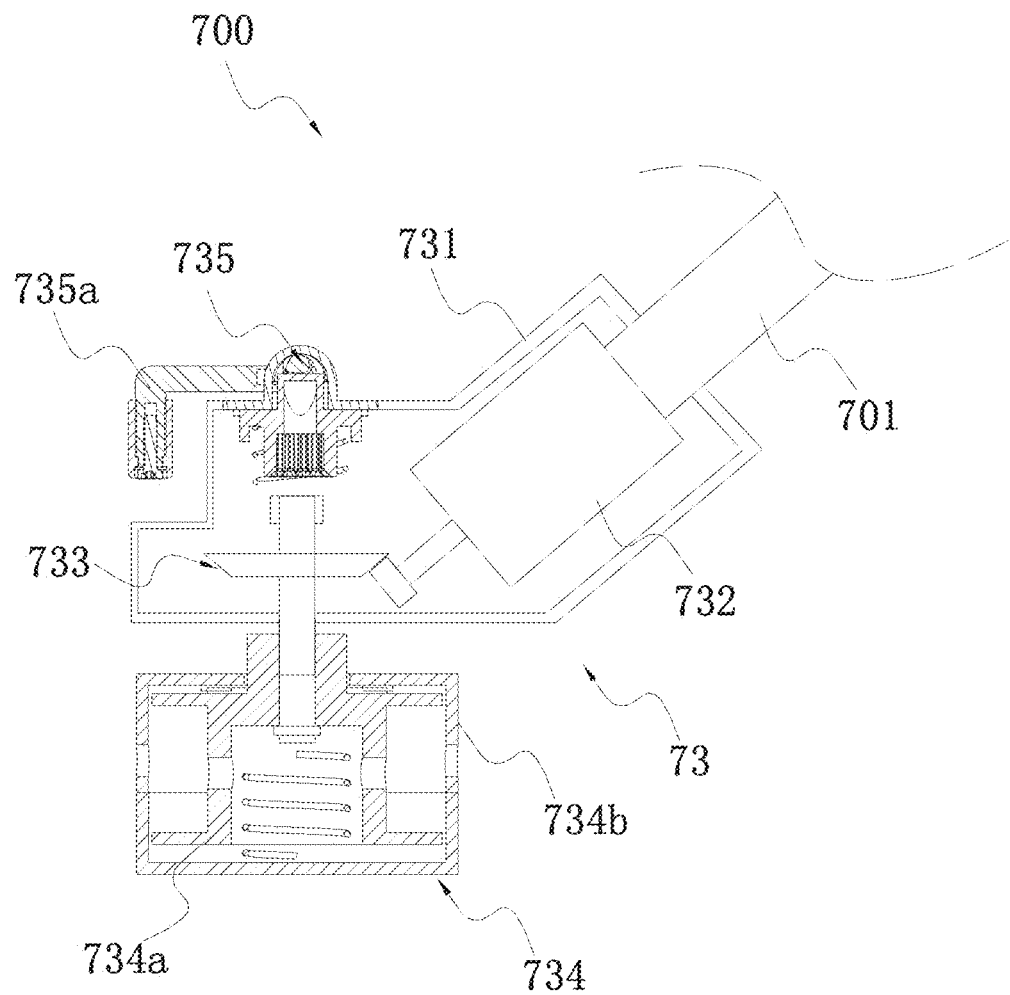
FIG. 10 is a sectional view of a grass trimmer according to a second example.

As shown in FIG. 10, the grass trimmer 700 in a second example includes a connecting rod 701, a rear end device, and a front end device 73. The front end device 73 includes a housing 731, an electric motor 732, a drive device 733, and a grass trimmer head 734. The housing 731 accommodates the drive device 733 and the electric motor 732, the drive device 733 is disposed between the electric motor 732 and the grass trimmer head 734 to connect the electric motor 732 to the grass trimmer head 734, and the drive device 733 transmits power outputted by the electric motor 732 to the grass trimmer head 734. The grass trimmer head 734 includes a spool 734a and a head housing 734b, and the electric motor 732 drives the spool 734a or the head housing 734b through the drive device 733 so that the grass trimmer head 734 rotates about the first axis. The front end device 73 further includes an operating device 735 configured to be connected to the drive device 733. The operating device 735 includes an operating member 735a connectable to the drive device 733, and movement of the operating member 735a is transmitted to the spool 734a or the head housing 734b through the drive device 733 without the need to transmit power to the spool 734a or the head housing 734b through the electric motor 732. When the grass trimmer 700 is in the winding mode, the operating member 735a rotates to drive the drive device 733 to rotate, and the drive device 733 drives the spool 734a or the head housing 734b to rotate so as to generate relative movement between the spool 734a and the head housing 734b. When the grass trimmer 700 is in the grass trimming mode, the operating member 735a is disengaged from the drive device 733, the electric motor 732 drives the drive device 733 to rotate, and the drive device 733 drives the spool 734a or the head housing 734b to drive the grass trimmer head 734 to rotate.

Figure 11:
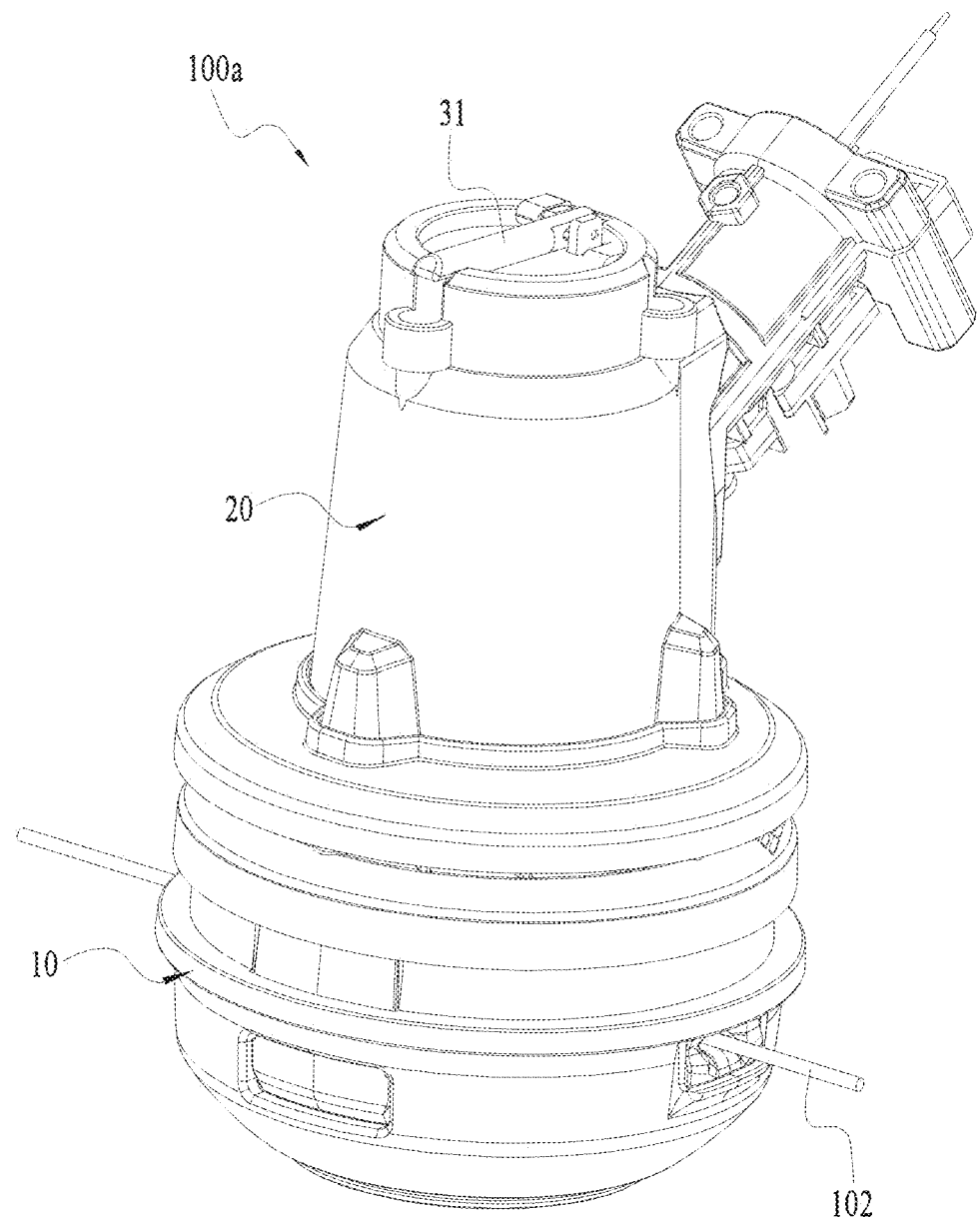
FIG. 11 is a perspective view of a front end device of a grass trimmer when a crank handle is at a horizontal position according to a third example.
Figure 12:
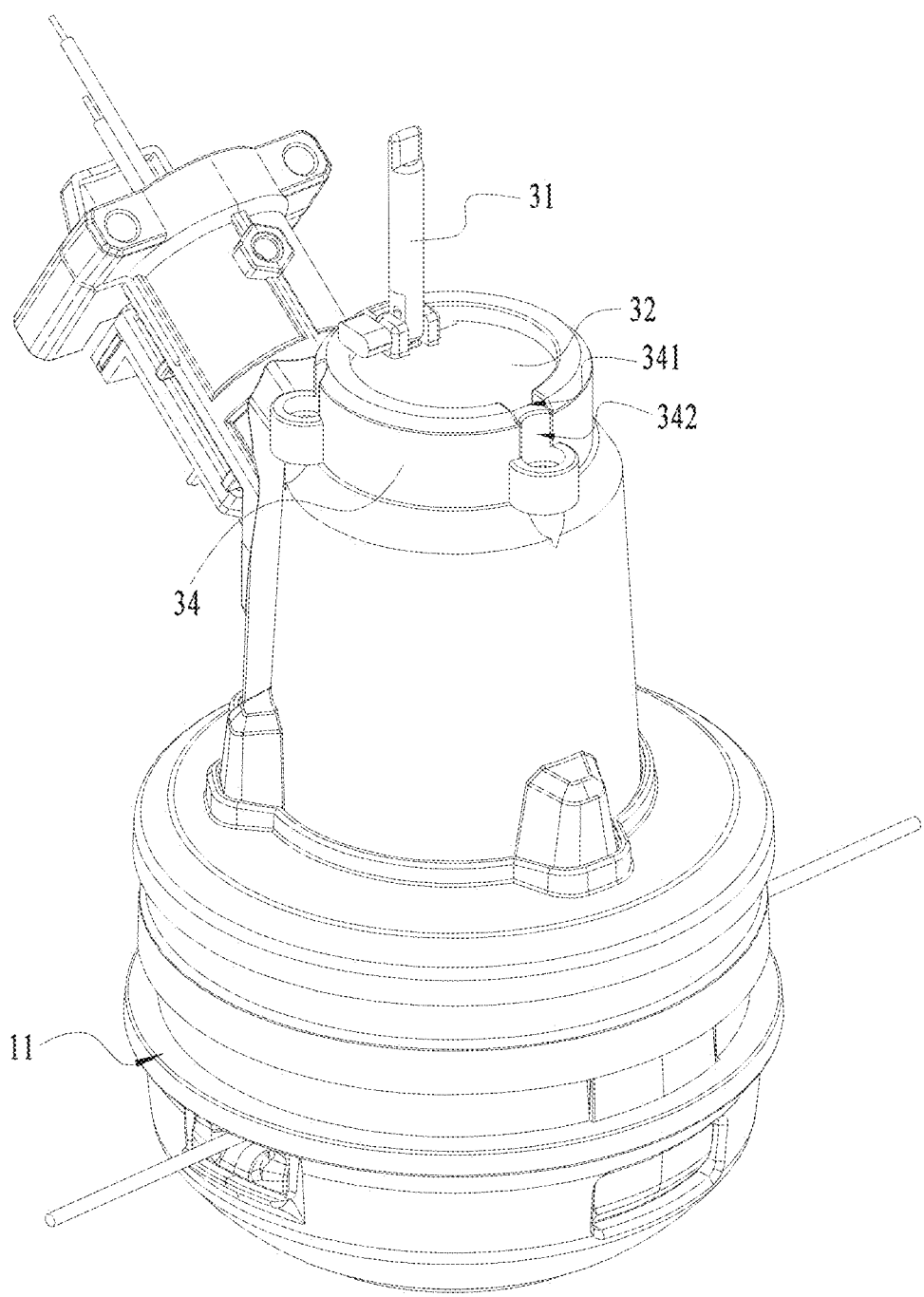
FIG. 12 is a perspective view of the front end device in FIG. 11 when the crank handle is at a vertical position.
Figure 13:
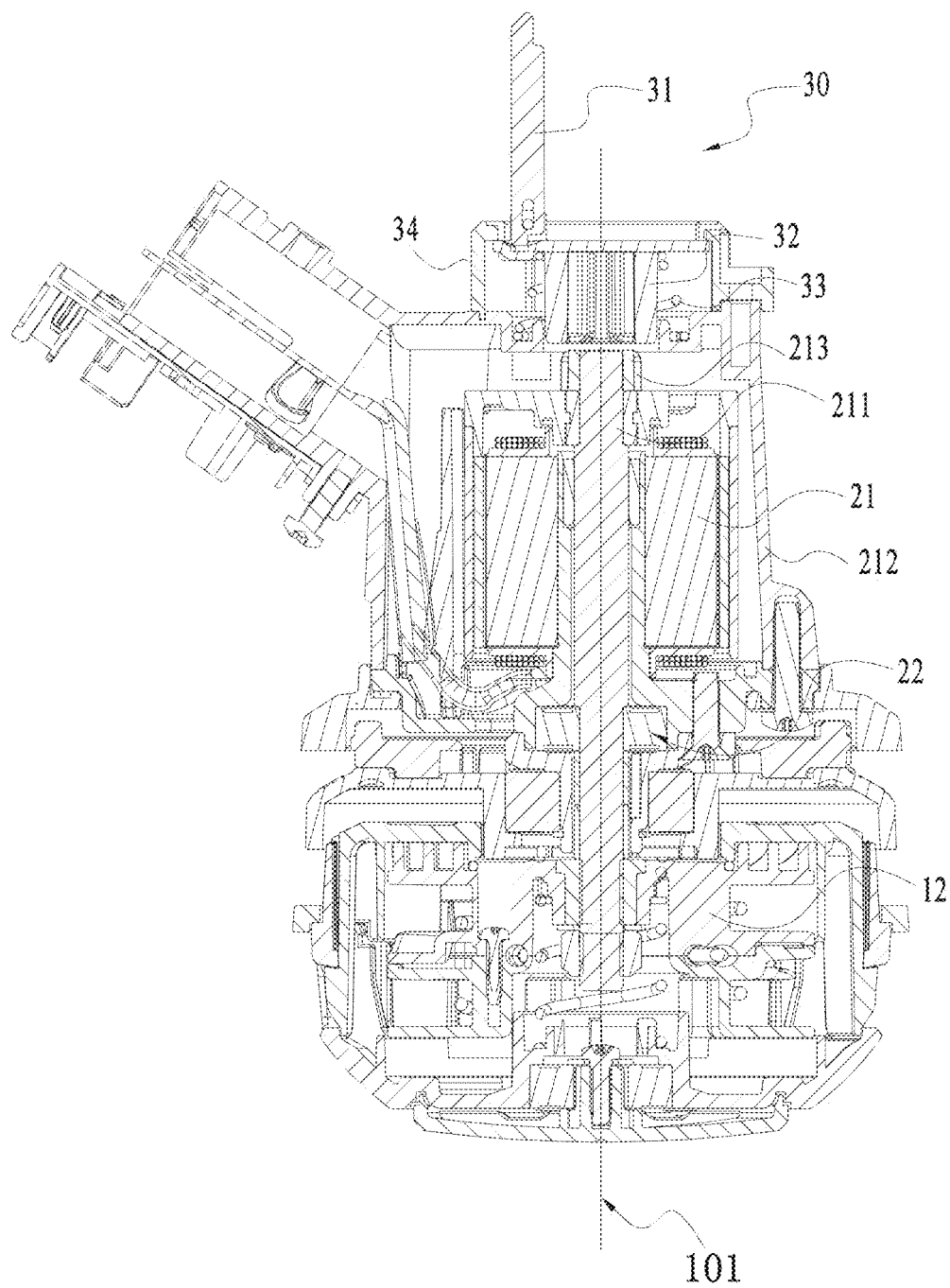
FIG. 13 is a sectional view of a structure shown in FIG. 12 when the crank handle is at a vertical position and an operating assembly is in a non-winding state.
Figure 14:
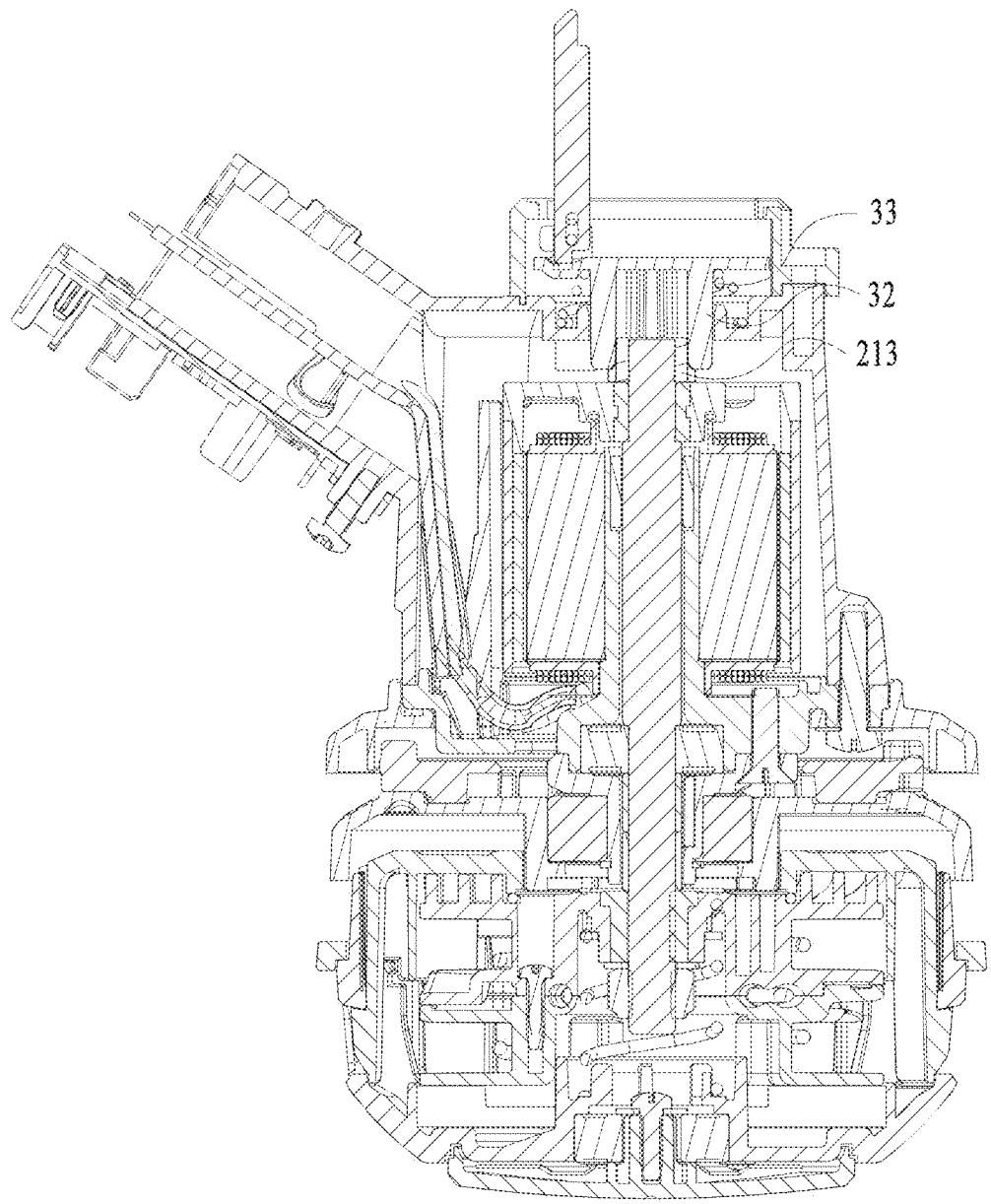
FIG. 14 is a sectional view of a structure shown in FIG. 12 when the crank handle is at a vertical position and an operating assembly is in a winding state.
Figure 15:
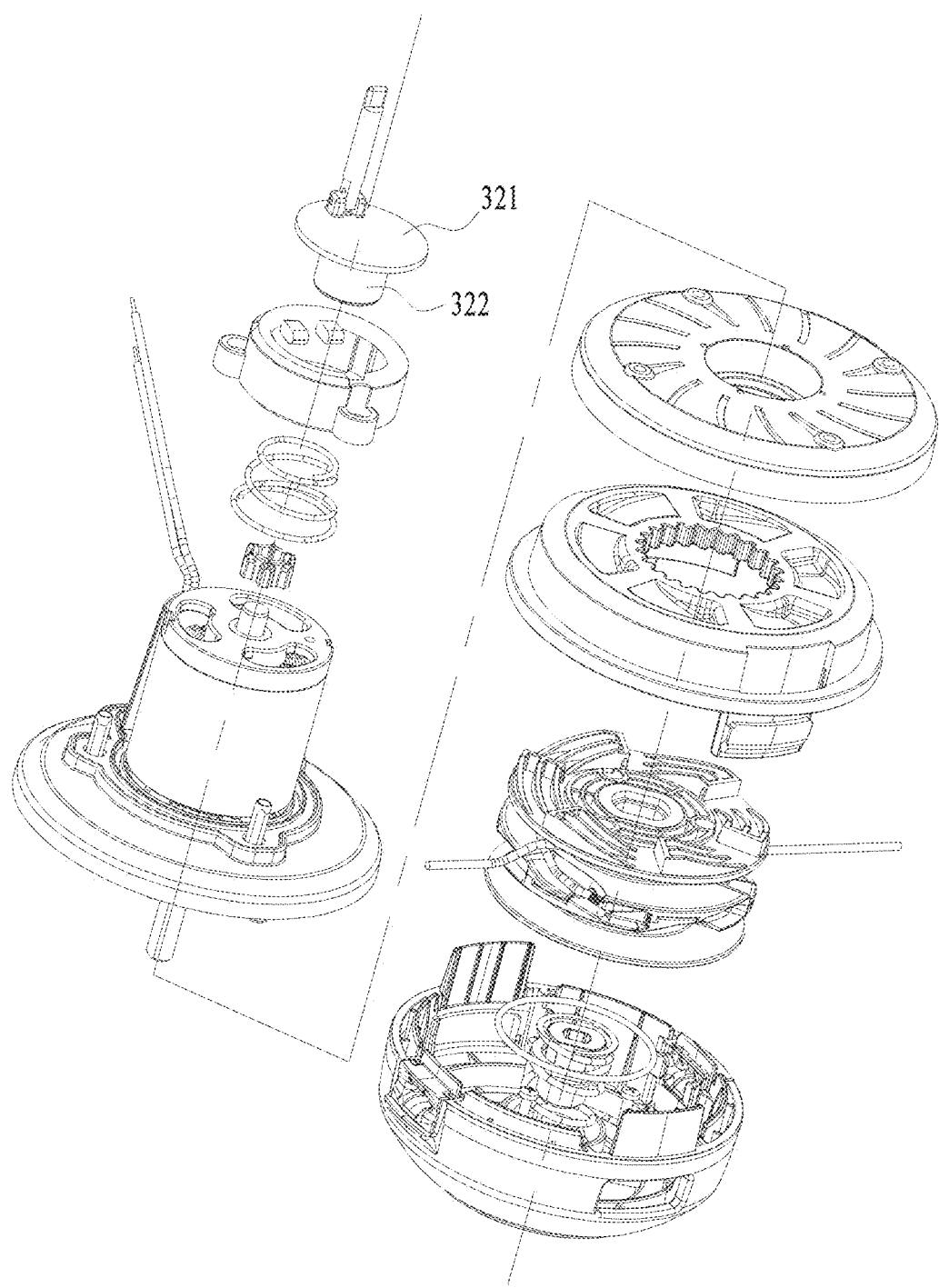
FIG. 15 is an exploded view of a structure shown in FIG. 12 from a first viewing angle.
Figure 16:
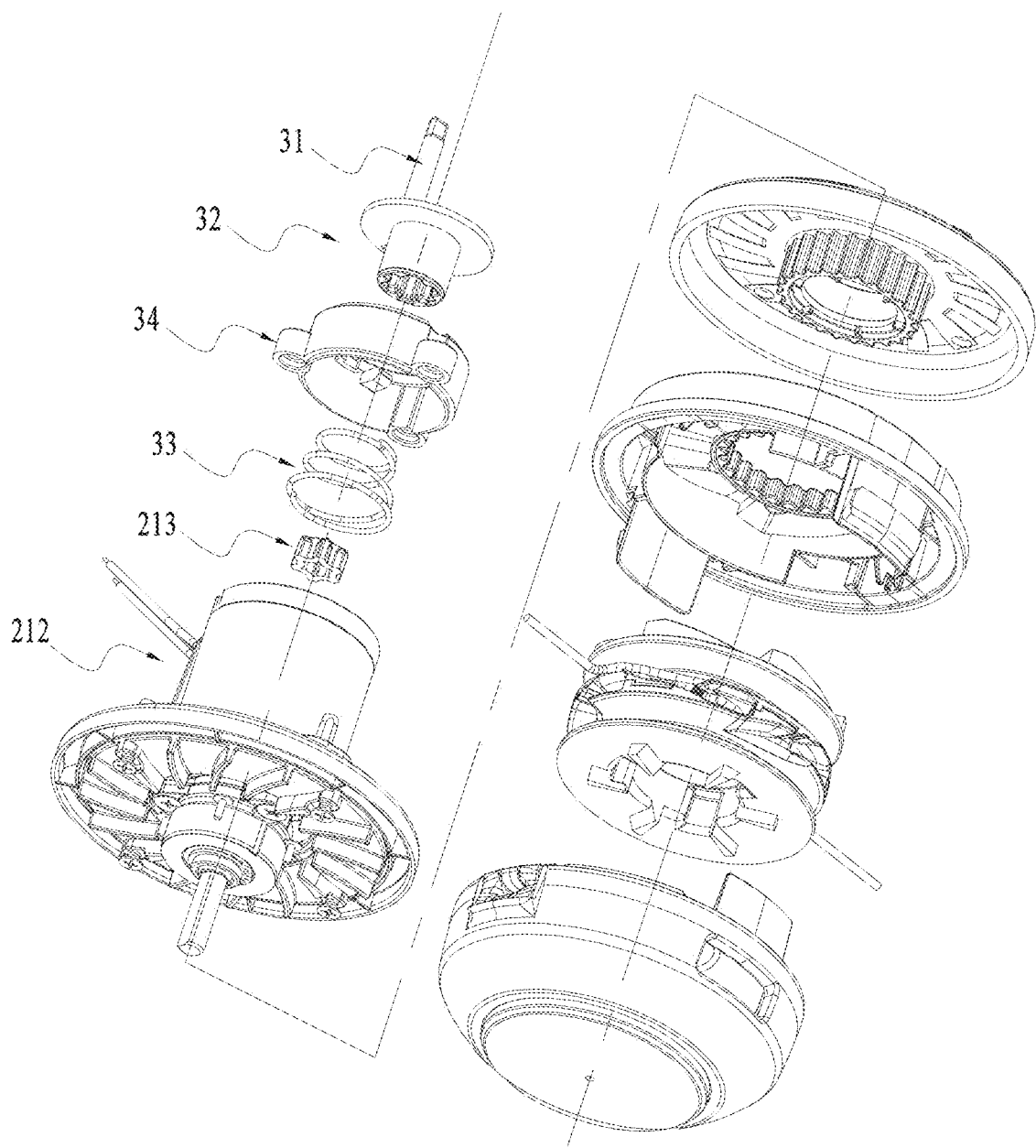
FIG. 16 is an exploded view of a structure shown in FIG. 12 from a second viewing angle.

FIG. 11 is a front end device 100a of a grass trimmer according to a third example. The grass trimmer in the third example has the same rear end device and connecting rod as the grass trimmer in the first example. The front end device 100a in the third example is the same as the front end device 400a in the first example. A function of a drive device 20 in the third example is basically the same as the drive device in the first example, and a difference lies in a specific structure of the drive device 20 being different from that in the first example. An operating device 30 in the third example may achieve basically the same function as the operating device 70 in the first example, and a difference is that a specific structure of the operating device 30 in the third example is different from a specific structure of the operating device 70 in the first example.

As shown in FIG. 11, the front end device 100a includes a grass trimmer head 10 and the drive device 20. The grass trimmer head 10 is configured to trim the grass, and the drive device 20 is configured to drive the grass trimmer head 10 to rotate about a rotation axis 101.

As shown in FIGS. 11 to 16, the drive device 20 includes a motor 21, a motor housing 212, and a transmission assembly 22. The motor 21 is configured to drive the grass trimmer head 10 to rotate, and the motor 21 may specifically include a motor shaft 211. In this example, the motor 21 also rotates about the rotation axis 101. It is to be understood that in other examples, the motor shaft 211 may not rotate about the rotation axis 101. For example, the motor shaft 211 may rotate about a straight line parallel to the rotation axis 101, and the motor shaft 211 may also rotate about a straight line perpendicular to the rotation axis 101. The motor housing 212 is used for accommodating the motor 21. The motor housing 212 may be formed with an accommodation cavity in which the motor 21 is disposed. The transmission assembly 22 is configured to transmit power between the motor 21 and the grass trimmer head 10.

The motor 211 is specifically an electric motor, which is further a brushless electric motor, and further, the electric motor is an outer rotor brushless electric motor. The electric motor includes a rotor assembly and a stator assembly, where the rotor assembly includes a rotor shaft, and the rotor shaft is the motor shaft 211.

The grass trimmer head 10 is configured to drive the grass trimmer rope 102 to rotate at a high speed to cut vegetation, and the grass trimmer head 10 includes a head housing 11 and a spool 12. The spool is used for the grass trimmer rope 102 to be wound around, and the head housing 11 is used for accommodating the spool 12. The spool 12 is disposed in an accommodation space surrounded by the head housing 11.

The front end device 100a further includes the user-operable operating device 30 disposed on the drive device 20, and the operating device 30 may be operated to wind the rope.

Further, the operating device 30 includes a winding state and a non-winding state. When the operating device 30 is in the winding state, the operating device 30 is in a transmission connection with the motor 21 to drive the grass trimmer head 10 so that the spool 12 rotates relative to the head housing 11 about the rotation axis 101 as an axis, thereby winding the rope. When the operating device 30 is in the non-winding state, the operating device 30 is disengaged from the motor 21.

Specifically, the grass trimmer has an automatic winding mode, a manual winding mode, and a grass trimming mode. It can also be considered that the grass trimmer head 10 has an automatic winding mode, a manual winding mode, and a grass trimming mode. When the grass trimmer head 10 is in the automatic winding mode, the motor 21 may drive the spool 12 to rotate relative to the head housing 11 about the rotation axis 101 along the first rotation direction, thereby automatically winding the grass trimmer rope 102 around the spool 12. When the grass trimmer head 10 is in the manual winding mode, the operating device 30 is in the winding state, the user may rotate the spool 12 relative to the head housing 11 about the rotation axis 101 along the first rotation direction through the operating device 30, and the grass trimmer rope 102 may be wound around the spool 12. When the user activates the motor 21 by operating the operation switch, the motor 21 can drive the spool 12 to rotate about the rotation axis 101 along the second rotation direction so that the grass trimmer is in the grass trimming mode. In this example, when viewed from the motor 21 to the grass trimmer head 10, the first rotation direction may be regarded as a counterclockwise direction, and correspondingly, the second rotation direction may be regarded as a clockwise direction, but it is not limited thereto. It is to be understood that in other examples, the motor shaft 211 may also be connected to the head housing 11 to drive the head housing 11 to rotate; in this manner, when the grass trimmer head 10 is in the automatic winding mode, the motor 21 drives the head housing 11 to rotate so that the spool 12 rotates relative to the head housing 11 along the first rotation direction, thereby automatically winding the grass trimmer rope 102 around the spool 12. Similarly, the operating device 30 may be connected to the head housing 11; when the grass trimmer head 10 is in the manual winding mode, the user operates the operating device 30 to drive the head housing 11 to rotate so that the spool 12 rotates relative to the head housing 11 along the first rotation direction, thereby winding the grass trimmer rope 102 around the spool 12.

In this manner, the grass trimmer head 10 may not only transmit power from the motor 21 to the spool 12, thereby automatically winding the grass trimmer rope 102, but also transmit the power from the operating device 30 to the spool 12, thereby winding the grass trimmer rope 102 around the spool 12 so that the user may either automatically wind the grass trimmer rope 102 by triggering the operation switch, or manually wind the grass trimmer rope 102 through the operating device 30, and thus a manual and automatic integrated grass trimmer is truly provided. In this manner, on the one hand, when the user rotates the operating device 30 to wind the grass trimmer rope 102, the user may feel fatigued. At this time, the user may operate the operation switch so as to automatically wind the grass trimmer rope 102 around the spool 12, thereby facilitating the operation of the user and improving the operation efficiency. In addition, when the automatic winding mode of the grass trimmer fails, the user may also manually wind the grass trimmer rope 102 around the spool 12 through the operating device 30, thereby improving the reliable performance of the grass trimmer; and the problem of the tangled rope and dirty hands caused by the hands in contact with the grass trimmer head when the rope is manually wound can be avoided, thereby improving the winding speed and the user experience and improving the operation efficiency.

The operating device 30 specifically includes a crank handle 31 and a rotary button 32. The crank handle 31 is hinged on a top of the rotary button 32, and the crank handle 31 is used for pressing the rotary button 32 downward when the operating device 30 is in the winding state so that the rotary button 32 is connected to the motor shaft 211 of the motor 21, and the crank handle 31 is rotated by an external force, thereby winding the rope; when the operating device 30 is in the non-winding state, the rotary button 32 and the motor shaft 211 are in a separated state. Specifically, the crank handle 31 may rotate from a vertical position (a position parallel to the rotation axis 101) to a horizontal position. When the crank handle 31 is at the vertical position, the crank handle 31 is pressed downward so as to drive the rotary button 32 downward to be connected to the motor shaft 211. It is to be understood that when the crank handle 31 is at an inclined position, the crank handle 31 may also be pressed downward, but the operation efficiency is low.

Further, the operating device 30 further includes an elastic reset member 33, two ends of which act on the rotary button 32 and the motor housing 212, respectively. In the winding state, the elastic reset member 33 is in a compressed state; in the non-winding state, the rotary button 32 and the motor shaft 211 are in a separated state under the action of the elastic reset member 33. The elastic reset member 33 is provided so that the operating device 30 can quickly switch between the winding state and the non-winding state, and the structure is simple, easy to implement, and low in cost.

The motor 21 further includes a shaft sleeve 213. The shaft sleeve 213 is sleeved on a top of the motor shaft 211 and can drive the motor shaft 211 to rotate. In the winding state, the rotary button 32 is connected to the shaft sleeve 213 to achieve the transmission connection with the motor shaft 211; in the non-winding state, the rotary button 32 and the shaft sleeve 213 are in a separated state. The shaft sleeve 213 is provided so that the motor shaft 211 can be avoided from being worn, and the service life of the motor shaft 211 can be prolonged.

The operating device 30 further includes an annular cover plate 34, the annular cover plate 34 is connected to a top of the motor housing 212 and forms an accommodation cavity with the motor casing 212, the rotary button 32 is located in the accommodation cavity, and the crank handle 31 is at least partially located outside the annular cover plate 34 so that the crank handle 31 is operable. When the operating device 30 is in the non-winding state, the rotary button 32 and the shaft sleeve 213 of the motor shaft 211 are in a separated state under the action of the elastic reset member 33. When the operating device 30 is in the winding state, the user needs to turn the crank handle 31 to the vertical position, the rotary button 32 is pressed through the crank handle 31 until the rotary button 32 mates with the shaft sleeve 213 on the motor shaft 211, and then the crank handle 31 is rotated, thereby winding the rope. After a winding operation is completed, the crank handle 31 is released and placed at the horizontal position.

Further, the annular cover plate 34 is provided with a positioning groove 341, one end of the crank handle 31 is hinged to the rotary button 32, and the other end of the crank handle 31 may be lifted to the vertical position or placed flat at the horizontal position to be clamped in the positioning groove 341. The positioning groove 341 is provided so that it is convenient to store the crank handle 31. Furthermore, a hand-locking groove 342 is disposed on a side of an outer circumference of the annular cover plate 34 away from a position where the crank handle 31 is hinged to the rotary button 32, the hand-locking groove 342 communicates with the positioning groove 341, and the hand-locking groove 342 is provided, which is convenient for the hands to lift the crank handle 31.

Preferably, the rotary button 32 has a T-shaped cross section and includes a limiting portion 321 and a rotating portion 322 that are vertically connected. The crank handle 31 is hinged to a top surface of the limiting portion 321. In the non-winding state, under the action of the elastic reset member 33, an upper surface of the limiting portion 321 abuts against an inner top surface of the annular cover plate 34, that is, the inner top surface of the annular cover plate 34 has a certain limiting effect on the rotary button 32; in the winding state, under the pressing action of the crank handle 31, a certain distance exists between the limiting portion 321 and the inner top surface of the annular cover plate 34. The rotating portion 322 is connected to a lower surface of the limiting portion 321, and the rotating portion 322 is configured to be connected to the shaft sleeve 213. Specifically, the rotating portion 322 is clamped to the shaft sleeve 213.

Further, a middle part of the rotating portion 322 is provided with a clamping hole, and the shaft sleeve 213 is clamped to the clamping hole. Preferably, the clamping hole is a special-shaped hole, and an outer peripheral shape of the shaft sleeve 213 is adapted to a shape of the special-shaped hole so that the shaft sleeve 123 may rotate with the rotating portion 322. A special-shaped structure is provided so that a connector is not provided, the cost is saved, and the reliability is relatively high.

The elastic reset member 33 is sleeved on an outer circumference of the rotating portion 322, a limiting groove is disposed on the motor housing 212, an upper end of the elastic reset member 33 abuts between the limiting portion 321 and the rotating portion 322, and a lower end of the elastic reset member 33 is located in the limiting groove. Preferably, the elastic reset member 33 is a pagoda-shaped spring. The pagoda-shaped spring has advantages of a small volume and a large load, is suitable for small spaces, and has a certain shock absorption effect so that a smooth winding process can be ensured.

The above illustrates and describes basic principles, main features, and advantages of the present disclosure. It is to be understood by those skilled in the art that the preceding examples do not limit the present disclosure in any form, and technical solutions obtained by means of equivalent substitution or equivalent transformation fall within the scope of the present disclosure.

What is claimed is:

1. A grass trimmer, comprising:
a grass trimmer head comprising a spool used for a grass trimmer rope to be wound around and a head housing for accommodating at least part of the spool;
a drive device separate from the spool, the drive device configured to drive the grass trimmer head to rotate; and
an operating member connected to the drive device and comprising an operating portion for a user to operate;
wherein the grass trimmer has a winding mode, and, when the grass trimmer is in the winding mode, movement of the operating member is transmitted to the spool or the head housing through the drive device so as to generate a relative movement that is between the spool and the head housing and through which the grass trimmer rope is wound around the spool, and
wherein the drive device comprises an electric motor configured to drive the spool or the head housing, the electric motor comprises a motor shaft, when the grass trimmer is in the winding mode, the electric motor is not powered on and the operating member mechanically drives the motor shaft to rotate.

2. The grass trimmer of claim 1, wherein the movement of the operating member is transmitted to the spool or the head housing through the motor shaft.

3. The grass trimmer of claim 2, wherein the drive device further comprises a housing for accommodating the electric motor, the grass trimmer further comprises a connecting rod connecting the housing, and the operating member is connected to the housing.

4. The grass trimmer of claim 2, wherein the grass trimmer further comprises a clutch device capable of connecting the operating member to the motor shaft.

5. The grass trimmer of claim 4, wherein the grass trimmer further has a grass trimming mode and the clutch device does not transmit power between the operating member and the motor shaft when the grass trimmer is in the grass trimming mode.

6. The grass trimmer of claim 1, further comprising a clutch device and wherein the clutch device has a first state and a second state, when the clutch device is in the first state, the movement of the operating member is transmitted to the motor shaft through the clutch device and the grass trimmer enters the winding mode, and, when the clutch device is in the second state, the clutch device does not transmit power between the operating member and the motor shaft and the grass trimmer enters a grass trimming mode.

7. The grass trimmer of claim 6, wherein the clutch device comprises a clutch element capable of moving to a transmission position and a non-transmission position, the clutch device is in the first state when the clutch element moves to the transmission position, and the clutch device is in the second state when the clutch element moves to the non-transmission position.

8. The grass trimmer of claim 7, further comprising a reset element capable of generating a biasing press that drives the clutch element to move toward the non-transmission position.

9. The grass trimmer of claim 1, wherein the grass trimmer further comprises a grass trimming mode, and, when the grass trimmer is in the grass trimming mode, the electric motor is powered on, starts to operate, and drives the grass trimmer head to rotate.

10. The grass trimmer of claim 1, wherein, when the grass trimmer is in the winding mode, rotation of the operating member is transmitted to the spool through the motor shaft and the drive device is connected to the spool.

11. The grass trimmer of claim 10, wherein, when the grass trimmer is in the winding mode, a distance between the operating portion and a first axis which the operating member rotates is greater than or equal to 40 mm and less than or equal to 100 mm.

12. The grass trimmer of claim 1, wherein the operating portion is disposed on an upper side of the grass trimmer head.

13. The grass trimmer of claim 1, wherein the operating member is at least partially disposed on an upper side of the drive device.

14. The grass trimmer of claim 1, wherein the grass trimmer further has a grass trimming mode, the drive device drives the grass trimmer head to rotate when the grass trimmer is in the grass trimming mode, and the operating member is installed to the grass trimmer when the grass trimmer is in the grass trimming mode.

15. A grass trimmer, comprising:
a main body comprising a grass trimmer head comprising a spool used for a grass trimmer rope to be wound around, a head housing for accommodating at least part of the spool, and a drive device separate from the spool and configured to drive the grass trimmer head to rotate; and an operating member for a user to operate;

wherein the grass trimmer has a winding mode and a grass trimming mode, when the grass trimmer is in the winding mode, movement of the operating member is transmitted through the drive device to the spool or the head housing so as to generate a relative movement that is between the spool and the head housing and through which the grass trimmer rope is wound around the spool, and, when the grass trimmer is in the grass trimming mode, the drive device drives the grass trimmer head to rotate and the operating member is installed to the main body, and wherein the drive device comprises an electric motor configured to drive the spool or the head housing, the electric motor comprises a motor shaft, when the grass trimmer is in the winding mode, the electric motor is not powered on and the operating member mechanically drives the motor shaft to rotate.

16. The grass trimmer of claim 15, wherein the operating member is detachably installed to the main body.

17. The grass trimmer of claim 15, wherein the operating member is non-detachably installed to the main body.

18. The grass trimmer of claim 15, wherein the drive device comprises a housing for accommodating the electric motor, the housing comprises a top portion and a surrounding portion, the surrounding portion surrounds the electric motor, the top portion is disposed on an upper side of the electric motor, and the operating member is connected to the top portion.

19. The grass trimmer of claim 18, wherein the operating member is rotatably connected to the top portion.

* * * * *